(12) United States Patent
Pruett

(10) Patent No.: US 9,760,134 B1
(45) Date of Patent: Sep. 12, 2017

(54) HYDRAULIC CARD RETAINER

(71) Applicant: Raytheon Company, Waltham, UT (US)

(72) Inventor: James A. Pruett, Allen, TX (US)

(73) Assignee: Raytheon Company, Waltham, MA (US)

( * ) Notice: Subject to any disclaimer, the term of this patent is extended or adjusted under 35 U.S.C. 154(b) by 15 days.

(21) Appl. No.: 15/053,988

(22) Filed: Feb. 25, 2016

(51) Int. Cl.
*H05K 7/20* (2006.01)
*G06F 1/16* (2006.01)
*G06F 1/20* (2006.01)
*H05K 7/02* (2006.01)
*G06F 1/18* (2006.01)

(52) U.S. Cl.
CPC .............. *G06F 1/183* (2013.01); *G06F 1/20* (2013.01)

(58) Field of Classification Search
CPC . G06F 1/183; G06F 1/185; G06F 1/20; H01L 23/473; H01L 23/433; H01L 23/4334; H01L 23/4338
USPC ...... 361/679.32, 679.53, 689, 699, 807, 810
See application file for complete search history.

(56) References Cited

U.S. PATENT DOCUMENTS

| | | | |
|---|---|---|---|
| 2,762,395 A | 9/1956 | Lamb | |
| 3,904,933 A * | 9/1975 | Davis | H05K 7/1404 165/80.4 |
| 4,480,287 A | 10/1984 | Jensen | |
| 4,938,279 A * | 7/1990 | Betker | H01L 23/473 165/104.33 |
| 4,994,937 A * | 2/1991 | Morrison | H05K 7/1409 174/16.3 |
| 5,222,668 A | 6/1993 | Frankeny et al. | |
| 5,813,876 A | 9/1998 | Rutigliano | |
| 6,712,630 B1 | 3/2004 | Davidov | |
| 7,626,820 B1 * | 12/2009 | Konshak | H05K 7/20672 165/104.33 |
| 8,215,377 B1 * | 7/2012 | Monson | F28D 15/02 165/104.21 |
| 8,599,557 B2 * | 12/2013 | Peterson | G06F 1/20 165/104.21 |
| 8,659,897 B2 * | 2/2014 | Meijer | G06F 1/20 361/679.32 |
| 8,780,556 B1 | 7/2014 | Ditri | |
| 2007/0297137 A1 * | 12/2007 | Glahn | H05K 7/1404 361/699 |

* cited by examiner

*Primary Examiner* — Nidhi Thaker

(57) ABSTRACT

A hydraulic card retainer can be operable to retain a CCA within a card cage. The hydraulic card retainer can comprise a tube section which defines an interior envelope. The interior envelope can be operable to contain a volume of fluid. The hydraulic card retainer can further comprise an interfacing section which can be in fluid communication with the tube section. The hydraulic card retainer can further comprise an actuator which can be at least partially supported by the interfacing section and which can also be operable to form a fluid-tight seal at the interfacing section. The actuator can operate to apply a compression force to the volume of fluid upon actuation. The compression force can cause at least a portion of the tube section to expand, thereby generating and applying a retaining force between the CCA/chassis assembly and the card cage.

17 Claims, 7 Drawing Sheets

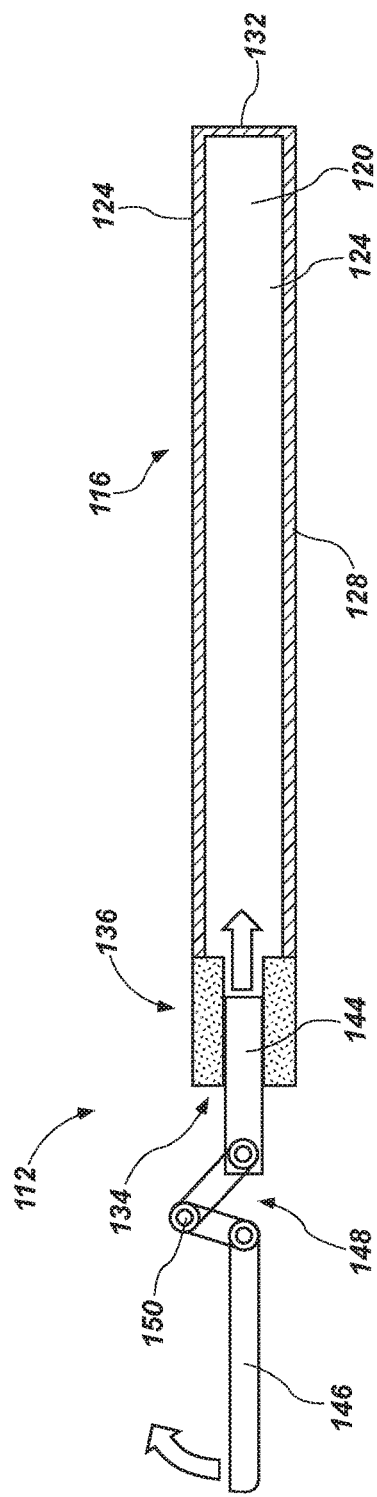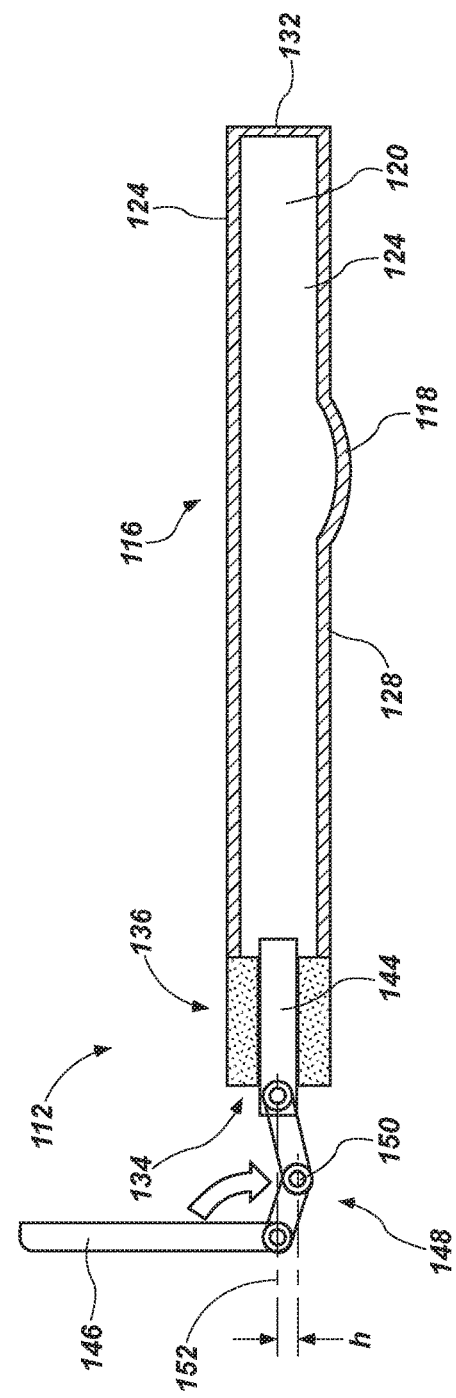
FIG. 4A
FIG. 4B

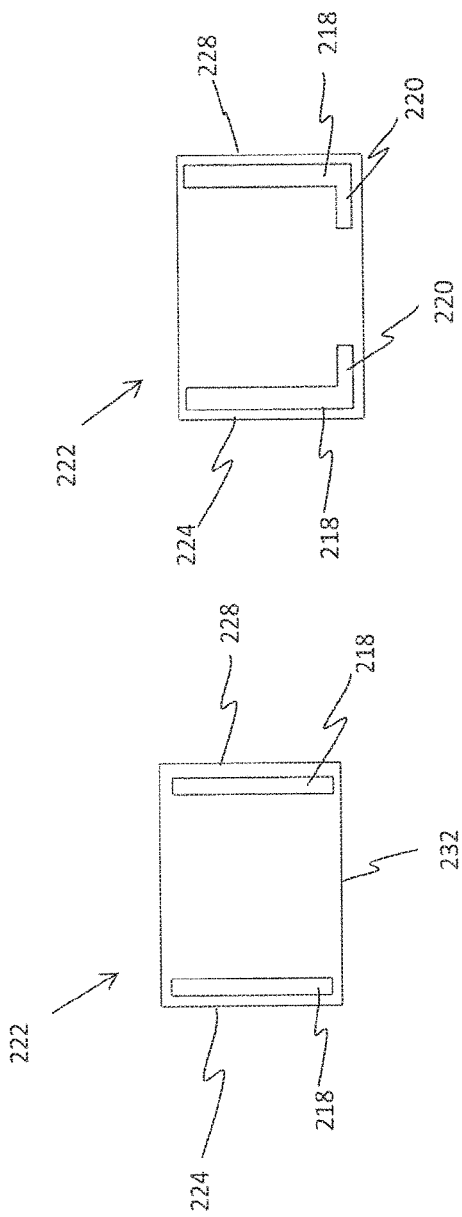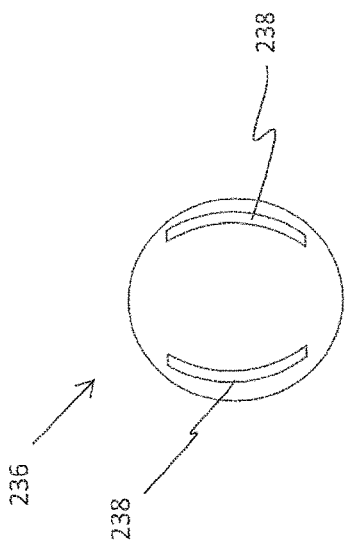

HYDRAULIC CARD RETAINER

BACKGROUND

Computational systems are often made up of at least one circuit card assemblies (CCAs) in a card cage that are designed to be removed and replaced. In order to maintain the CCAs in place, CCA retention systems or CCA retainers have been developed. The CCA retainers can secure the CCA within a card cage after the CCA has been placed within the card cage. Typical circuit card assembly retention systems, such as those utilizing wedges or springs, often have problems operating properly, for example, ensuring that the wedge structures do not stick in place during retraction of the CCA once the restraining force is removed. These systems can further comprise a prohibitively large volume for the design of a many CCA systems. In addition, such systems can have a weight or cost that can be prohibitive for their use in many applications.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 4A illustrates a cross-sectional side view of a hydraulic card retainer in accordance with another example of the present disclosure, with the actuator in an inactive position;

FIG. 4B illustrates a cross-sectional side view of the hydraulic card retainer of FIG. 4A with the actuator in an actuated position to compress the fluid within the tube section;

FIGS. 7A-7C illustrate various example configurations of CCA s operable with corresponding various example configurations of hydraulic card retainers.

Figure 1A:
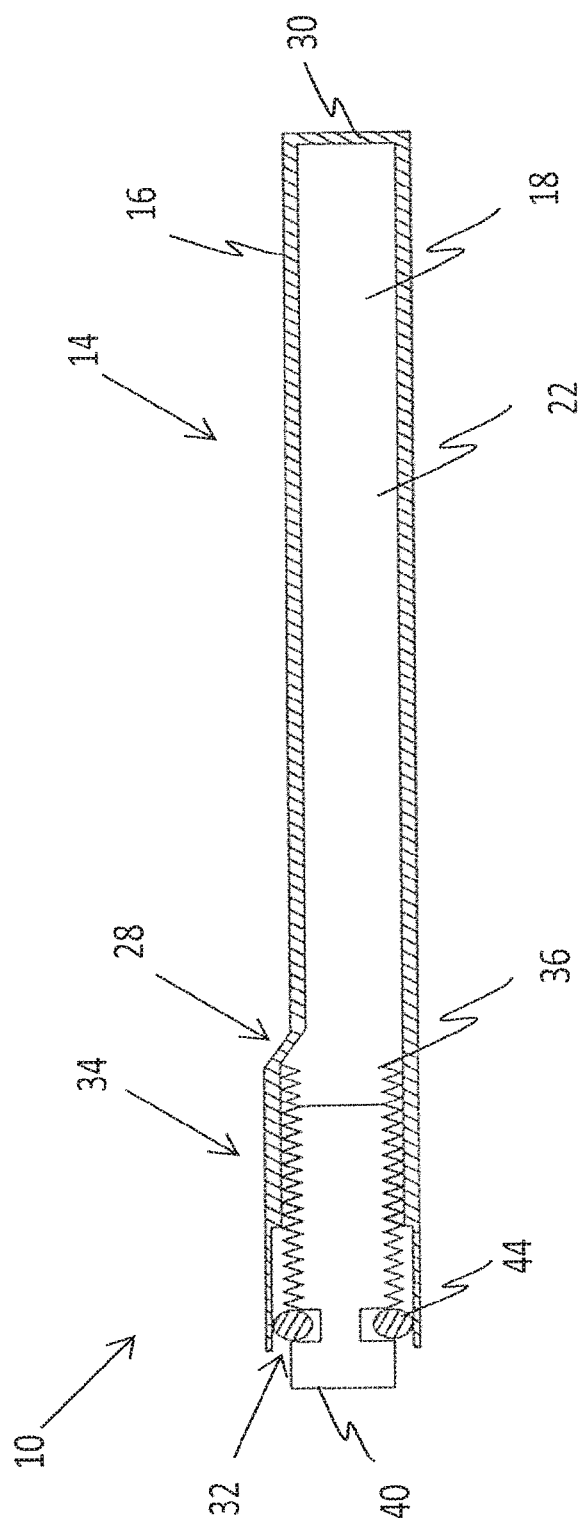
FIG. 1A illustrates a cross-sectional side-view of a hydraulic card retainer in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness can in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" can be either abutting or connected. Such elements can also be near or close to each other without necessarily contacting each other. The exact degree of proximity can in some cases depend on the specific context.

An initial overview of technology embodiments is provided below and then specific technology embodiments are described in further detail later. This initial summary is intended to aid readers in understanding the technology more quickly. It is not intended to identify key features or essential features of the technology, nor is it intended to limit the scope of the claimed subject matter.

Efforts aimed at improving conventional circuit card assembly (CCA) retention systems are underway. However, despite advances in materials, mechanisms, fasteners, and design, such retention systems have limitations due to complexity, weight, and ease of use when applied to circuit card retention systems. These limitations include, but are not limited to: (i) the wedges of traditional circuit card assembly wedge structure retention systems tend to stick in place during CCA retraction once the restraining force is removed; (ii) the volume required for the card retainers can be prohibitive for a given circuit card assembly structure design; and (iii) due to the materials required and the complexities of the card retainers, the weight and cost of the card retention systems can be prohibitive.

A hydraulic card retainer is disclosed that can be operable to retain a CCA. In one example, the hydraulic card retainer can comprise a tube section which defines an interior envelope. The interior envelope can be operable to contain a volume of fluid. The hydraulic card retainer can further comprise an interfacing section which can be in fluid communication with the tube section. The hydraulic card retainer can further comprise an actuator which can be at least partially supported by the interfacing section, and which can also be operable to form a fluid-tight seal at the interfacing section. The actuator can operate to apply a compression force to the volume of fluid upon actuation, which compression force can cause at least a portion of the tube section to expand. As such, the hydraulic card retainer can be utilized to secure or retain a CCA within a card cage by positioning the hydraulic card retainer about the CCA and card cage, and by actuating the actuator.

A system for retaining a circuit card assembly is also disclosed. In one example, the system for retaining a circuit card can comprise a CCA, a chassis in support of the CCA, and a card cage. The card cage can comprise a plurality of rails forming a plurality of channels. The card cage can be operable to receive the CCA and the chassis within one of the channels. The system for retaining a circuit card can further comprise a hydraulic card retainer. The hydraulic card retainer can be operable with the chassis and can be in contact with the CCA. The hydraulic card retainer can further comprise a volume of fluid within a tube section. Additionally, the hydraulic card retainer can comprise an actuator. The actuator can be operable to apply a compressive force to the volume of fluid, which compressive force functions to expand the tube section. Expanding the tube section can generate and apply a retaining force to and between the CCA/chassis assembly and one of the rails of the card cage, thus retaining the CCA and the chassis within the card cage.

In one example, the hydraulic card retainer can comprise a self-contained configuration, meaning that the volume of fluid is stored locally within the tube section, and does not rely upon outside fluid sources, pumps, etc. to continually supply, recirculate, or replenish fluid to the tube section during operation. Rather, once initially filled, the hydraulic card retainer is ready for use with the fluid within the tube section being static in that there is no circulation of fluid in and out of the tube section during operation of the hydraulic card retainer. Once the tube section reservoir is filled, it is contained and ready for use. Of course, this does not mean that the fluid cannot be replaced by replacing old or used fluid with new or fresh fluid as needed.

A method for retaining a circuit card assembly within a card cage is also disclosed. In one example, the method can comprise obtaining a card cage having a plurality of rails forming respective channels and obtaining a CCA as supported by a chassis. The method can also comprise positioning a hydraulic card retainer about the CCA and the chassis, such that the hydraulic card retainer is in contact with the CCA. The hydraulic card retainer can comprise a tube section and a volume of fluid contained within the tube section. The method can further comprise inserting the CCA and the chassis within one of the channels, the hydraulic card retainer being adjacent at least one rail. The method can also comprise applying a compression force to the volume of fluid, such that the tube section is caused to expand and apply a force to the CCA and the at least one rail thereby retaining the CCA and the chassis within the card cage.

FIG. 1A illustrates a cross-sectional side-view of a hydraulic card retainer in accordance with an example of the present disclosure. The hydraulic card retainer 10 can comprise a tube section 14, an interfacing section 34, and an actuator operative to apply a compression force to the volume of fluid within the tube section 14 to cause the tube section 14 to expand or deform. The tube section 14 can define, at least in part, a volume of space, referred to herein as an interior envelope or reservoir 18, operable to receive and contain a volume of fluid 22. The tube section 14 can further comprise an exterior wall 16 and a closed end 30, which can be operable to help contain the volume of fluid 22. The tube section 14 can be formed from a material suitable to expand and contract (e.g., bulge), at least once, and in some cases repeatedly. In the example illustrated in FIG. 1A, the tube section can comprise a material makeup configured to deform or expand in response to an applied pressure. Example materials for the tube section 14 can include a thin-walled metal, a plastic or others. More specifically, and as discussed below, example suitable materials can include metals or metal alloys, such as aluminum, thin gauge steel, CRES, beryllium copper, and plastics, such as polyethylene (HDPE), and parylene/HDPE. Other materials may be used to form a deformable or expandable tube section suitable for meeting the purposes described herein, as will be recognized by those skilled in the art. As such, those materials identified herein should not be considered limiting in any way.

In one example, the volume of fluid 22 can comprise an incompressible fluid, operable to receive a compression force and transfer the force to the tube section 14 for the purpose of expanding or deforming the tube section. For example, incompressible fluids can include, but are not limited to, Ethylene/Glycol Water (EGW), Propylene/Glycol Water (PGW), Polyalphaolefin (PAO), oil, and others.

In other examples, the volume of fluid 22 can comprise a compressible fluid, also operable to receive a compression force and to transfer the force to the tube section 14 for the purpose of expanding or deforming the tube section. For instance, compressible fluids can include, but are not limited to, air and other gaseous fluid types. In this case, the hydraulic card retainer 10 can be equipped with a valve, such as a Schrader valve similar to those used on tires. The hydraulic card retainer 10 can be pressurized with air via the valve to expand the tube section 14, and the air can be released to deflate the tube section 14.

The tube section 14 of the hydraulic card retainer 10 can be joined to the interfacing section 34, such that the tube section 14 is in fluid communication with the interfacing section 34, meaning that there is a fluid interface between the tube section 14 and the interfacing section 34. In one example, such as that shown in FIG. 1, the tube section 14 can be integrally formed with the interfacing section 34, such that the interior envelope 18 extends between the tube section 14 and at least part of the interfacing section 34. The interfacing section 34 can further comprise an open end 32 opposite the closed end 30 of the tube section 14. The interfacing section 34 can further comprise a threaded section 36 formed in the open end 32 operative to receive and support an actuator.

In one aspect, the interfacing section 34 can be larger in diameter than the tube section 14, and can comprise a neck 28. The neck 28 can comprise a narrowing section from the interfacing section 34 to the tube section 14. Fluid can be contained within the interfacing section 34 and the neck 28, which can be forced into the tube section 14 to apply the compressive force to the fluid within the interior envelope 18 upon actuation of the actuator, causing the tube section 14 to expand or deform (e.g., bulge).

In the exemplary embodiment shown in FIG. 1A, the interfacing section 34 can be integrally formed with the tube section 14 and can be formed from the same material. In order to maintain support and integrity of the actuator, the interfacing section 34 can be configured not to expand or deform as the tube section 14 expands or deforms due to the compressive forces being applied within the tube section 14. Alternatively, interfacing section 34 can comprise a component or part separate from the tube section 14, with the interfacing section 34 and the tube section 14 being operative to couple or join together to form at least part of the hydraulic card retainer 10. Joining or coupling of these component parts can be such that a fluid tight seal is formed.

The hydraulic card retainer 10 can further comprise an actuator operative to apply or facilitate application of the compressive forces to the fluid within the various components of the hydraulic card retainer, which in turn, transfer or apply similar and suitable forces to the tube section 14 to cause expansion or deformation of the tube section 14. In one example, such as that shown in FIG. 1A, the actuator can comprise a setscrew 40. The setscrew 40 can be inserted into the open end 32 of the interfacing section 34, and caused to interface with the threaded section 36 of the interfacing section 34, thereby securing or coupling the setscrew 40 to the interfacing section 34. Furthermore, the setscrew 40 can be at least partially supported by the interfacing section 34. The setscrew 40 can be operable to prevent the volume of fluid 22 within the interfacing section 34 and within the interior envelope 18 from escaping by forming a fluid-tight seal within the interior of the interfacing section 34.

The setscrew 40 can comprise a diameter suitable for use within the interfacing section 34. The setscrew 40 can be formed of metal, such as, for example steel or titanium. The setscrew 40 can be operable to be turned in different directions within the threaded section 36, causing the setscrew 40 to displace in a bi-directional manner, such as inward to apply the compressive force to the volume of fluid 22, and outward to remove the compressive force from the volume of fluid 22. An advantage of using an actuator, such as the setscrew 40, can be the relatively small amount of torque required to be applied to the setscrew 40 in comparison to the large compressive force applied to the volume of fluid 22. In addition, differing amounts or magnitudes of compressive forces can be achieved depending upon the distance traveled or the degree of actuation by the actuator within the interfacing section 34.

The hydraulic card retainer can further comprise a seal about the actuator to further seal the fluid within the hydraulic card retainer 10, as well as to prevent contaminants from entering the hydraulic card retainer 10. In one aspect, the seal can comprise an o-ring 44 operable with the setscrew 40 to seal the setscrew 40 and an interior surface of the interfacing section 34. The o-ring 44 can form a fluid-tight seal between the setscrew 40 and the interior of the interfacing section 34, preventing fluid from exiting the interior envelope 18 of the hydraulic card retainer 10. As such, the hydraulic card retainer 10 can maintain the volume of fluid 22 at a constant level.

The o-ring 44 can be positioned around the setscrew 40 and can act to create a fluid-tight seal at the open end 32. The o-ring 44 can comprise a rubber or a plastic material. The o-ring 44 can be operable to move within the interfacing section 34 with the setscrew 40 as the setscrew 40 is actuated in either direction.

Figure 1B:
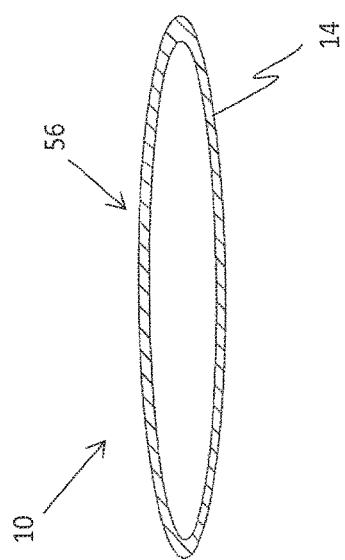
FIG. 1B illustrates a cross-sectional axial view of a portion of the hydraulic card retainer illustrated in FIG. 1A.

FIG. 1A illustrates the exemplary hydraulic card retainer 10 in an uncompressed state or condition, where the setscrew 40 has not been actuated and a pressure suitable to deform or expand the tube section 14 has not been applied to the volume of fluid 22. FIG. 1B illustrates one exemplary cross-sectional view of the interior envelope 18 of the tube section 14 of the hydraulic card retainer 10 also in its uncompressed condition. As illustrated in FIG. 1B, the tube section 14 can have an elliptical cross-section 56, configured such that the tube section 14 has a tendency to expand more along a vertical axis relative to the cross-section shown, rather than a horizontal axis upon actuation of the setscrew 40. Indeed, this configuration would not expand further along the major axis of the elliptical cross section 56 when the setscrew 40 is actuated, resulting in an increase in pressure within the interior envelope 18.

As indicated, the setscrew 40 can be actuated by turning the setscrew to cause it to move inward toward the tube section 14. Doing so causes a compression force to be applied to the volume of fluid 22 within the tube section 14, resulting in the expanding or deforming of the tube section 14 in one or more directions. The pressure applied can be proportional to the degree of actuation of the setscrew 40.

Figure 2:
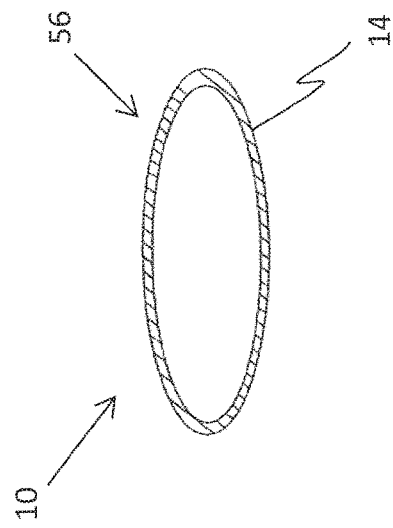
FIG. 2 illustrates another cross-sectional axial view of a portion of the hydraulic card retainer of FIG. 1A.

As illustrated in FIG. 2, upon turning the setscrew 40 to cause it to move inward within the interfacing section 34, the interior envelope 18 becomes shorter in the lateral direction of the hydraulic card retainer 10. The volume of fluid 22 within the interior envelope 18 remains constant, thus causing an increase in pressure within the interior envelope 18. As discussed herein, the fluid of the volume of fluid 22 can be incompressible. In order to maintain a constant volume of fluid 22 within the hydraulic card retainer 10, as pressure inside the tube section 14 increases the interior envelope 18 and the tube section 14 expand or deform, which expansion can be further facilitated and aided based on the shape and configuration of the tube section 14. With the closed end 30 fixed, little or no expansion in the axial direction occurs. Rather, upon actuation of the setscrew 40 and application of the compression force to the fluid 22, the interior envelope 18 becomes shorter, and the tube section 14 is caused to expand outward, with a majority of the expansion occurring in the vertical direction relative to FIG. 2.

The exemplary embodiment of FIG. 2 illustrates a bulged cross-section 58, resulting from the increased pressure within the internal envelope 18 due to actuating the setscrew 40. As shown in FIG. 2, the interior envelope 18 and the tube section 14 can expand along the minor elliptical axis.

The setscrew 40 can further be actuate to remove the compression force from the volume of fluid 22. Upon actuating the setscrew 40 in a reverse manner, the pressure within the tube section 14 can be decreased and the tube section 14 can be caused to retract. The setscrew 40 can be unscrewed, thereby relieving the increased pressure within the interior envelope 18, and thus facilitating the tube section 14 to again take the form of the elliptical cross-section 54, as shown in FIG. 1B. This can represent full retraction of the tube section 14. Alternatively, if the setscrew 40 is unscrewed a small amount, the pressure within the interior envelope 18 can be proportionally relieved, wherein the tube section 14 only partially retracts.

The tube section 14 can be configured to expand and contract repeatedly. The volume of fluid 22 can be limited, such that when compressed, the volume of fluid expands the tube section 14 only within the elastic limit of the materials making up the tube section 14. By limiting the volume of fluid 22, the tube section 14 can be caused to experience only elastic deformation, rather than any plastic deformation. Therefore, the hydraulic card retainer 10 can be reused in the same or different applications.

In order for the tube section 14 to expand and contract and maintain the volume of fluid 22 to the degree needed to provide suitable retention capabilities within a CCA application, the tube section 14 can be configured to withstand the increased pressure induced by the compressive force applied to the volume of fluid 22. In order to do so safely and minimize the likelihood that the tube section 14 will rupture, the actuator, the interfacing section 34 and the tube section 14 can be configured such that the hydraulic card retainer is able to apply a clamping force. In one example, the clamping force can be within a range of 100 and 600 lbs. Additionally, the tube section 14 can be configured to have a suitable factor of safety, such as at least 1.2.

Testing has shown that several materials meet the standards outlined above. These materials can include metals, such as aluminum, thin gauged steel, CRES, beryllium copper, and plastics, such as polyethylene (HDPE), and parylene/HDPE. Additionally, each of these materials can be operable to be expanded and retracted or contracted multiple times.

Figure 3:
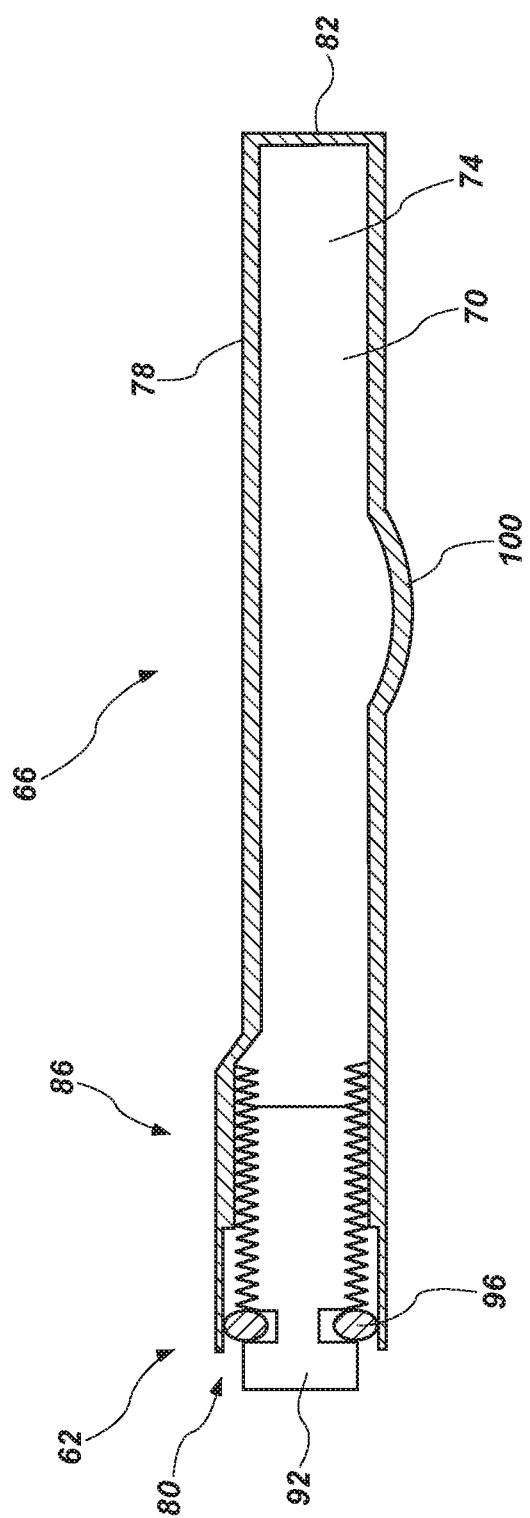
FIG. 3 illustrates a cross-sectional side view of a hydraulic card retainer in accordance with another example of the present disclosure.

FIG. 3 illustrates an additional example of the present disclosure. Specifically, FIG. 3 illustrates a hydraulic card retainer 62, which can comprise a tube section 66, an interfacing section 86 and an actuator 92, similar to those described above. As such, the description above is incorporated here, where applicable. The tube section 66 can define, at least in part, a volume of space, referred to as an interior envelope 70, which can be operative to receive and contain a volume of fluid 74. In one aspect, the volume of fluid 74 can be an incompressible fluid.

The tube section 66 can further comprise an exterior wall 78 and a closed end 78. The exterior wall 78 and the closed end 82 can be thin-walled.

An actuator 92 can be at least partially supported by the interfacing section 86, and can form a fluid-tight seal within the interfacing section 86. An o-ring 96 can be positioned about the actuator 92. The o-ring 96 can operate to form a seal between the interfacing section 86 and the actuator 92.

The actuator 92 can be actuated to cause an increase in pressure within the interior envelope 70, also as discussed above.

Upon experiencing an increase in pressure, the tube section 66/interior envelope 70 can deform or expand. Unlike the example card retainer of FIGS. 1-2, in this example, the interior envelope 70 and the tube section 66 can be configured such that only a portion of the tube section 66 is caused to expand. In the example shown, portion 100 is caused to expand. Although illustrative of one example design, the portion 100 is not intended to be limiting in any way. Indeed, other portions of the tube section 66 can be caused to expand or deform, depending on the design needs and parameters of the CCA system. For example, a portion can expand near the closed end 82, near the interfacing section 86, on the upper side of the hydraulic card retainer 62, on the lower side of the hydraulic card retainer 62, or on both the lower side and the upper side of the hydraulic card retainer 62. As those skilled in the art will recognize, the tube section 66 can be configured to facilitate deformation or expansion of any portion of the tube section. Parameters that can be manipulated and controlled are the number of expandable or deformable tube section portions, their size, location, etc.

In one aspect, the portion or portions of the tube section 66 intended to be made expandable or deformable can comprise a different wall thickness than the other areas of the tube section 66. The wall thickness in these areas can be made thinner so as to ensure that they expand or deform prior to the expansion of the entire tube section 66. As such, the tube section 66 can be configured to comprise focused areas of expansion or deformation. In another aspect, the tube section 66 can be configured such that these areas of expansion or deformation can be made to operate in addition to the entire tube section 66 expanding or deforming, such as in the manner discussed above with respect to the example card retainer of FIGS. 1 and 2.

An additional exemplary embodiment is shown in FIGS. 4A and 4B. Illustrated is a hydraulic card retainer 112 similar to those described above. The hydraulic card retainer 112 can comprise a tube section 116, an interfacing section 136, and an actuator operative to apply a compression force to the volume of fluid within the tube section 116 to cause the tube section 116 to expand or deform. The tube section 116 can comprise an interior envelope 120 operable to contain a volume of fluid 124. The volume of fluid 124 can be a compressible or an incompressible fluid. The tube section 116 can further comprise an exterior wall 128 and a closed end 132.

The interfacing section 136 can comprise an open end 134, and can receive and support the actuator, which is designed to be operative with the interfacing section 136. In this example, the actuator can comprise, for example, a lever and plunger design. The plunger 144 can be caused to move inward axially within the interfacing section 136, thus applying a compressive force to the volume of fluid 124 upon being driven towards the closed end 132. The plunger 144 can further be caused to move outward toward the open end 134 within the interfacing section 136 to remove the compressive force from the volume of fluid 124.

The plunger 144 can be coupled to a lever 146 that is actuatable to cause the plunger 144 to move bi-directionally within the interfacing section 136. For instance, the lever 146 can be operated in one direction to drive the plunger 144 axially at least partially into the interfacing section 136. The lever 146 can further be operated in a different direction to drive the plunger 144 axially at least partially out of the interfacing section 136. The actuator can further comprise a linkage assembly 148 that facilitates locking of the actuator into position. The linkage assembly 148 can comprise a pivot point 150 that travels over the centerline 152 to achieve the locking position while the additional two pivot points remain in line about the centerline 152. In the example shown, the pivot point 150 travels a distance h over the centerline 152.

Similar to the function of other actuators discussed herein, upon actuating the plunger 144 to be driven at least partially into the interfacing section 144, a compression force can be applied to the volume of fluid 124 within the interior envelope 120, thus causing all or at least a portion 118 of the tube section 116 to expand or deform in response to the increase in pressure. Upon actuating the plunger 144 to move axially toward the open end 134 of the interfacing section 136, the compression force can be removed from the volume of fluid 124. As a result, the tube section 116, and/or any expanded or deformed portions thereof, can retract and return to its/their original shape.

Figure 5:
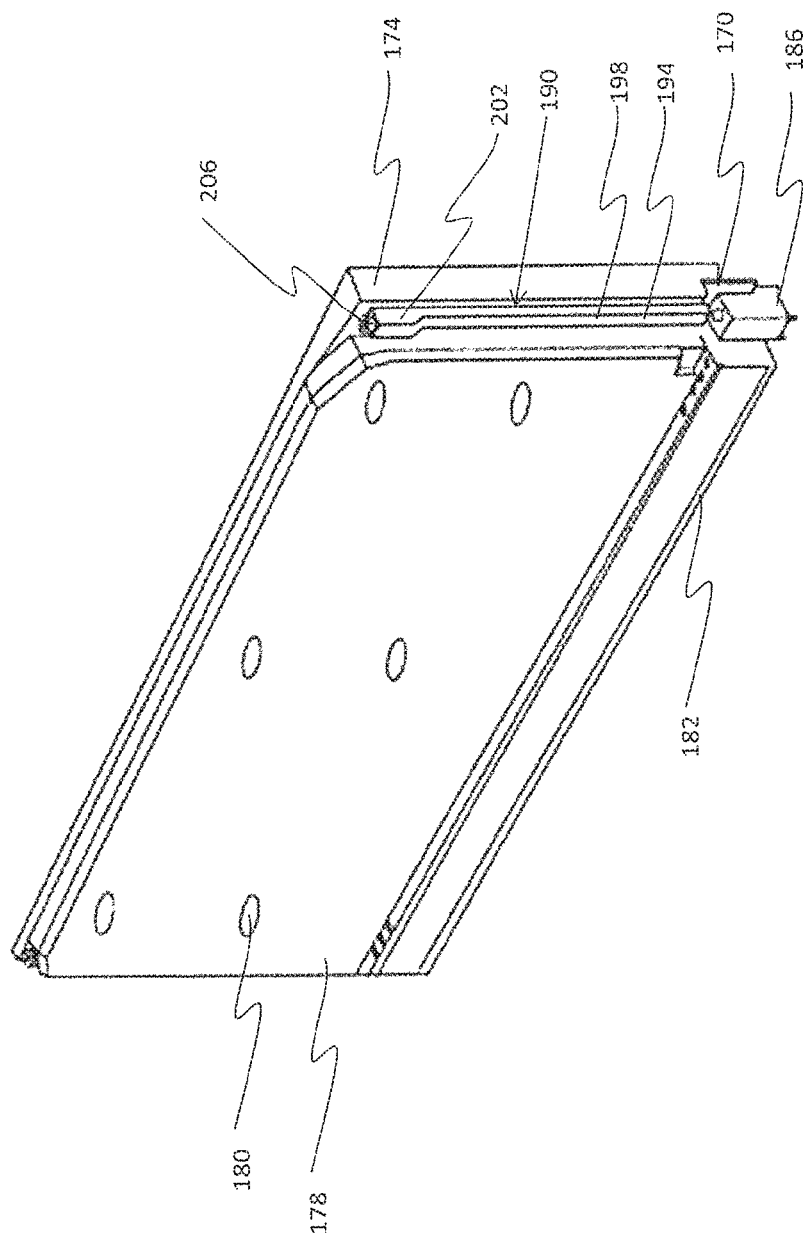
FIG. 5 illustrates a perspective view of an implementation of a hydraulic card retainer operable with a CCA supported about chassis in accordance with another example of the present disclosure.
Figure 6:
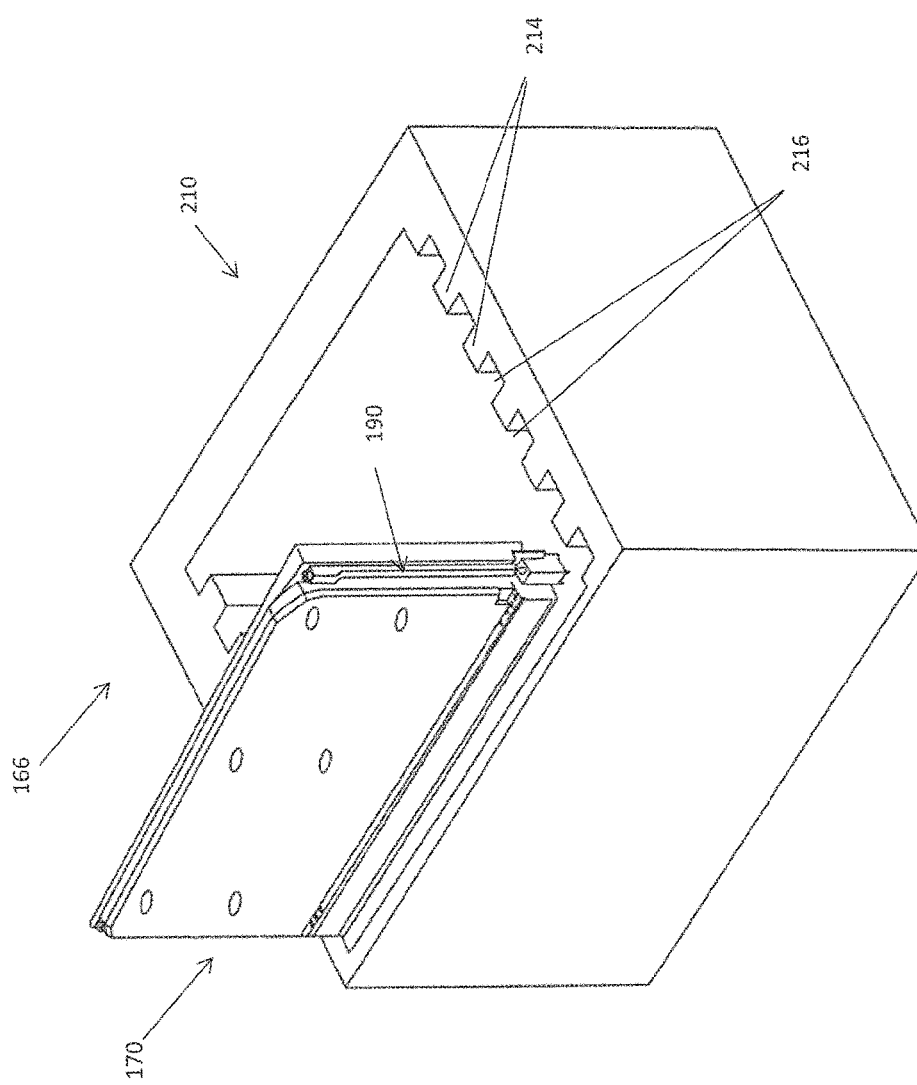
FIG. 6 illustrates a perspective view of a card cage operable with the hydraulic card retainer and CCA of FIG. 5.

FIGS. 5-6 illustrate an exemplary system 166 for retaining a circuit card assembly (CCA) within a card cage. As shown, the CCA 170 can be supported by a chassis 174. The CCA 170 can be protected by cover 178, opposite the chassis 174. The chassis 174 can further support alignment bushing 186 and electrical connectors 182. Alignment bushing 186 can serve to provide support and stability to the CCA 170. The electrical connectors 182 can serve to provide electrical communication between the CCA 170 and an external electrical or electronics system. The chassis 174 can comprise a rigid base supporting the components of the system 166, wherein in one aspect, the base can comprise a larger surface area than the CCA 170 to provide a place to mount the hydraulic card retainer. The CCA 170 can be coupled to chassis 174 using fasteners or adhesive or other means/methods as known in the art.

The cover 178 can fully encase and CCA 170, and can be held in place with fasteners 180. The fasteners 180 can pass through the cover 178 and fasten to the chassis 174.

A self-contained hydraulic card retainer 190 can be supported about and configured to operate with the chassis 174, such as about the surface area of the chassis 174 that extends beyond the CCA 170 (see FIG. 5). The hydraulic card retainer 190 can be mounted to the chassis 170 using fasteners or adhesives or other means. In some arrangements, a second self-contained hydraulic card retainer can also be supported by and operative with the chassis 174 to apply a similar pressure in a different location. The second hydraulic card retainer can be located at any position as needed or desired, such as proximally or distally (e.g., on an opposite side) from the self-contained hydraulic card retainer 190. The self-contained hydraulic card retainer 190 can be coupled to and supported by the chassis 174 for the purpose of contacting and applying pressure to retain the CCA 170 upon the actuator of the hydraulic card retainer 190, thus facilitating the retaining of the CCA 170 in place. In one aspect, the self-contained hydraulic card retainer 190 can operate to apply pressure to retain only to a single CCA.

In other aspects, multiple CCAs can be held in place by a single hydraulic card retainer.

Similar to other examples discussed herein, the self-contained hydraulic card retainer 190 can comprise a tube section 194. The self-contained hydraulic card retainer can further comprise an interfacing section 202. The interfacing section 202 can be in fluid communication with the tube section 194. The interfacing section 202 can support an actuator 206 that can comprise any number of designs, such as the ones discussed herein.

The tube section 194 and the interfacing section 202 can comprise a non-circulating volume of fluid 198, which can be a local volume of fluid, used only with the self-contained hydraulic card retainer 190. The actuator 206 can operate to apply a compressive force directly to the non-circulating volume of fluid 198, and can be in direct contact with the volume of fluid 198. Upon applying the compressive force to the non-circulating volume of fluid 198, the tube section 194 can expand or deform as discussed herein. Upon expanding, the tube section 198 can generate and apply a retaining force in a direction orthogonal or perpendicular to the CCA 170. The retaining force can act to retain the CCA 170, as will be discussed in more detail below.

The system 166 can further comprise a card cage 210 (see FIG. 6). The card cage 210 can comprise a plurality of card rails 214 that define a plurality of channels 216 having surfaces thereon upon which a retaining force can be applied. The chassis 174 supporting the CCA 170 and other elements shown in FIG. 5 can be configured to fit within one of the card rails 214. The CCA 170 and chassis 174 can be configured to fit fully within the card cage 210. However, for purposes of discussion, the CCA 170 and chassis 174 are shown just prior to installation into one of the card rails 214 of the card cage 210.

Similar to embodiments previously described herein, the tube section 194 can expand in response to actuating the actuator 206, causing a retaining force to be applied in a direction orthogonal to the CCA 170, and towards one of the card rails 214. With the CCA 170 and chassis 174 inserted and nested within one of the card rails 214, the hydraulic card retainer 190 can be situated between the chassis 174 and the card rail 214, such that upon actuation of the actuator 206 and application of a compression force to the fluid within the tube section 194, the tube section 194 can be caused to expand or deform (e.g., bulge) as the actuator acts upon the fluid within the tube section 194. Upon expansion, the tube section 194 can be caused to contact both a surface of the chassis 174 in one direction, and a surface of the card rail 214 in another, opposing direction. As this occurs, a retaining force is generated and caused to be applied between the chassis 174 and the card rail 214, thus effectively locking or retaining the CCA 170 and chassis 174 in place within the card cage 210. The magnitude of the retaining force applied by the hydraulic card retainer 190 can be dependent upon the degree of actuation by the actuator 206.

The actuator 206 can be actuated further to remove the compression force from the volume of fluid 198 within the tube section 194. Upon removing the compression force from the non-circulating volume of fluid 198, the tube section 194 can retract, wherein the retaining force is removed and no longer applied to retain the CCA 170 and the chassis 174 within the card cage 210, and the CCA 170 and chassis 174 can be removed. The cycle of applying a compression force to the fluid within the tube section 194 to expand the tube section 194, and later removing the compression force to retract the tube section 194 can be repeated as often as needed or desired. Indeed removing the compression force can cause the tube section 194 to return to it's pre-expanded condition or state.

Similar to the examples previously described herein, the tube section 194 can comprise a metal or a plastic. The non-circulating volume of fluid 194 can comprise an incompressible fluid. The non-circulating volume of fluid 198 can only be present within the tube section 194 and the interfacing section 202 in quantities, such that when the actuator 206 is actuated and applies a compressive force to the non-circulating volume of fluid 198, the tube section 194 does not expand past its elastic limit. As such, the tube section 194 never experiences plastic deformation. Therefore, the self-contained hydraulic card retainer 190 is operable to expand and retract multiple times.

In many cases, it will be desirable to support multiple CCA/chassis assemblies within the card cage 210. In such cases, each CCA/chassis assembly can be configured to operate with one or more self-contained hydraulic card retainers to retain it within the card cage 210. As shown in this example, the self-contained hydraulic card retainer 190 can be local to the CCA/chassis assembly. Additionally, the actuator 206 can be local to the self-contained hydraulic card retainer 190.

It is further recognized that the self-contained hydraulic card retainer 190 can function as a heat sink to the CCA 170, and can conduct heat away from the CCA 170 when the tube section 194 is in an expanded state, effectively transferring heat from the CCA 170 to the card cage 210 through the hydraulic card retainer 190.

Further example CCA configurations are illustrated in FIGS. 7A-7C, these being made possible, at least in part, by the ability of a hydraulic card retainer as discussed herein to comprise a shape and configuration other than linear. FIG. 7A illustrates a simplified embodiment of a standard CCA 222, shown from an overhead view. The standard CCA 222 can be rectangular, and further can be configured to be supported by a chassis mounted within a card cage, as previously described herein. FIG. 7A illustrates a self-contained hydraulic card retainer 218, similar to those previously described herein. As previously described, the self-contained hydraulic card retainer can be operable to apply a retaining force from a first side 224 of the CCA 222, and a second hydraulic card retainer an be operable to apply a retaining force from a second side 226 of the CCA 222.

FIG. 7B further illustrates the versatility of the self-contained hydraulic card retainer 218. The self-contained hydraulic card retainer 218 is shown again being operable with the CCA 222. In addition to being positioned about the first side 224 and the second side 228, the self-contained hydraulic card retainer 218 can be configured to comprise a non-linear configuration, such as having leg 220 extending in a different direction than the remaining part of the hydraulic card retainer. In addition to being able to comprise many different shapes and configurations to match the needs of the particular application in which the CCA will be used, the hydraulic card retainer can further provide cooling to the CCA 222. The self-contained hydraulic card retainer 218 can be further placed and shaped to provide a retaining force and cooling to other areas of the CCA, such as, for example, any edge of the CCA 222 or any other area of the CCA 222.

FIG. 7C illustrates an alternative CCA configuration. Some applications comprise CCAs that have specific and/or unusual shapes. For example, in defense or commercial applications, rockets or missiles can benefit from a CCA having a round or circular shape, such as the round CCA 236. The round CCA 236 can be secured in place by the use of a self-contained hydraulic card retainer 238, also formed in a curved shape. As illustrated, the self-contained hydraulic card retainer 238 can be formed into non-linear shapes and configured to conform to the shape of a corresponding CCA, thus providing a retaining force and a cooling path for CCAs having irregular or non-linear forms.

The present disclosure further contemplates one or more methods of retaining a CCA within a card cage. The method can comprise obtaining a card cage. The card cage can comprise a plurality of card rails. The plurality of card rails can form or define respective channels. The method can further comprise obtaining a CCA, and supporting the CCA by a chassis. The method can further comprise positioning a hydraulic card retainer about the CCA and the chassis. The hydraulic card retainer can be positioned such that it is in contact with the CCA/chassis assembly. Similar to previous examples, the hydraulic card retainer can comprise a tube section containing a volume of fluid.

The method can further comprise inserting the CCA and the chassis within one of the channels defined by the card rails of the card cage. Upon inserting the CCA and the chassis within one of the channels, the hydraulic card retainer can be positioned adjacent at least one rail of the plurality of rails.

The method can further comprise applying a compression force to the volume of fluid, such that the tube section 274 is caused to expand and apply a force between the CCA/chassis assembly and the at least one rail. Upon expanding, the applied force can act to retain the CCA and the chassis within the card cage.

Applying a compression force to the volume of fluid can comprise actuating an actuator. The actuator can be supported within the hydraulic card retainer, such as via an interfacing section. The interfacing section can be in fluid communication with the tube section, such that forces applied by the actuator to any fluid within the interfacing section will be transferred to the fluid within the tube section.

The method can further comprise actuating the actuator to remove the compression force from the volume of fluid, such that the tube section is caused to retract, thereby removing the retaining force from between the CCA/chassis assembly and the at least one card rail of the card cage. As such, the method further comprises removing the CCA/chassis assembly from the card cage for repair, replacement or other purposes.

With respect to the step of obtaining a CCA, this can include obtaining a CCA having a linear shape, a non-linear shape, a curved shape, and any others, the CCA being configured to be supported by a similarly shaped and/or configured chassis, and a hydraulic card retainer of similar shape and/or configuration utilized to facilitate retaining of the CCA within a similarly shaped and/or configured card cage.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics can be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A hydraulic card retainer, comprising: a tube section defining an interior envelope operable to contain a volume of fluid; an interfacing section in fluid communication with the tube section; and an actuator at least partially supported by the interfacing section and operable to form a fluid-tight seal at the interfacing section, wherein the actuator operates to apply a compression force to the volume of fluid upon actuation, such that at least a portion of the tube section is caused to expand; and wherein the interfacing section comprises a threaded inner surface and the actuator comprises a threaded screw operable to move axially in and out of the interfacing section.

2. The hydraulic card retainer of claim 1, wherein the actuator operates to remove the compression force from the volume of fluid upon actuation, such that the at least a portion of the tube section is caused to retract.

3. The hydraulic card retainer of claim 2, wherein the entirety of the tube section is caused to expand in response to applying the compression force and wherein the entirety of the tube section is caused to retract in response to removing the compression force.

4. The hydraulic card retainer of claim 3, wherein the tube section is operable to be expanded and retracted repeatedly.

5. The hydraulic card retainer of claim 4, wherein the tube section and the interfacing section are adaptable to be formed into non-linear axial configurations.

6. The hydraulic card retainer of claim 5, wherein the actuator comprises a plunger operable to move axially within the interfacing section.

7. The hydraulic card retainer of claim 5, wherein the tube section and the interfacing section are integrally formed.

8. A system for retaining a circuit card assembly (CCA), comprising: a circuit card assembly (CCA); a chassis in support of the CCA; a card cage comprising a plurality of rails forming a plurality of channels, the card cage operable to receive the CCA and the chassis within one of the channels; and a self-contained hydraulic card retainer operable with the chassis and the CCA, wherein the self-contained hydraulic card retainer comprises a non-circulating volume of fluid contained within a tube section, an interfacing section in fluid communication with the tube section; and an actuator at least partially supported by the interfacing section and operable to form a fluid-tight seal at the interfacing section; wherein the interfacing section comprises a threaded inner surface and the actuator comprises a threaded screw operable to move axially in and out of the interfacing section; wherein the actuator operable to apply a compressive force to the fluid and expand the tube section to apply a retaining force between the CCA and the chassis and one of the rails of the card cage to retain the CCA and the chassis within the card cage.

9. The system of claim 8, wherein the actuator is further operable to remove the compression force from the fluid, such that the tube section retracts and the retaining force is no longer applied.

10. The system of claim 9, wherein the self-contained hydraulic card retainer is operable to expand and to retract multiple times.

11. The system of claim 10, wherein the actuator is local to the self-contained hydraulic card retainer.

12. The system of claim 11, wherein the self-contained hydraulic card retainer is operable to be formed into a non-linear shape.

13. The system of claim 8, wherein each of the card cage and the self-contained hydraulic card retainer is operable to conduct heat away from the CCA when the tube section is expanded.

14. A method of retaining a circuit card assembly within a card cage, the method comprising: obtaining a card cage having a plurality of rails forming respective channels; obtaining a circuit card assembly (CCA) as supported by a chassis; positioning a hydraulic card retainer about the CCA and the chassis, such that the hydraulic card retainer is in contact with the CCA, the hydraulic card retainer comprising a tube section and a volume of fluid contained within the tube section; inserting the CCA and the chassis within one of the channels, the hydraulic card retainer being adjacent at least one rail; applying a compression force to the volume of fluid, such that the tube section is caused to expand and apply a retaining force between the CCA and the at least one rail thereby retaining the CCA and the chassis within the card cage; wherein the applying a compression force to the volume of fluid comprises actuating an actuator supported by an interface in fluid communication with the tube section as part of the hydraulic card retainer; and wherein the interface comprises a threaded inner surface and the actuator comprises a threaded screw operable to move axially in and out of the interface.

15. The method of claim 14, further comprising actuating the actuator to remove the compression force from the volume of fluid, such that the tube section is caused to retract and remove the force from the at least one rail.

16. The method of claim 15, further comprising removing the CCA and the chassis from the card cage upon the retaining force being removed.

17. The method of claim 14, wherein obtaining a CCA as supported by a chassis comprises obtaining a CCA having a non-linear design.

* * * * *